(12) United States Patent
Endo

(10) Patent No.: US 6,839,102 B2
(45) Date of Patent: Jan. 4, 2005

(54) LIQUID CRYSTAL DISPLAY DEVICE HAVING LIGHT GUIDE WITH REFRACTIVE SURFACE

(75) Inventor: Atsushi Endo, Chiba (JP)

(73) Assignee: Seiko Instruments Inc., Chiba (JP)

(*) Notice: Subject to any disclaimer, the term of this patent is extended or adjusted under 35 U.S.C. 154(b) by 0 days.

(21) Appl. No.: 10/159,874

(22) Filed: May 30, 2002

(65) Prior Publication Data

US 2002/0186334 A1 Dec. 12, 2002

(30) Foreign Application Priority Data

Jun. 6, 2001 (JP) .................................... 2001-171503

(51) Int. Cl.$^7$ .......................................... G02F 1/1335
(52) U.S. Cl. ..................... 349/65; 349/61; 349/62; 362/26; 362/31; 362/561; 385/146
(58) Field of Search .................... 349/61–63, 65–67; 385/146; 362/26, 31, 561

(56) References Cited

U.S. PATENT DOCUMENTS

| 6,147,725 A | * | 11/2000 | Yuuki et al. .................. 349/65 |
| 6,256,447 B1 | * | 7/2001 | Laine ......................... 385/146 |
| 2001/0019379 A1 | * | 9/2001 | Ishihara et al. ............... 349/65 |

* cited by examiner

*Primary Examiner*—Tarifur R. Chowdhury
*Assistant Examiner*—Michael H. Caley
(74) *Attorney, Agent, or Firm*—Adams & Wilks (57) ABSTRACT

A liquid crystal display device is provided which includes an increased brightness of a display panel by effectively utilizing light from a light source. In the liquid crystal display device, a refractive surface of a light guide plate for guiding light that enters an inner portion from the light source, is composed of a plurality of slant dividing surfaces and connection surfaces provided between the dividing surfaces. A slant angle of the dividing surfaces is set to one at which the light projected from the light source is reflected in a direction substantially parallel with a plate of the light guide plate.

21 Claims, 7 Drawing Sheets

LIQUID CRYSTAL DISPLAY DEVICE HAVING LIGHT GUIDE WITH REFRACTIVE SURFACE

BACKGROUND OF THE INVENTION

1. Field of the Invention

The present invention relates to a liquid crystal display device having a projector type backlight, more specifically, to a shape of a refractive surface of a light guide plate composing the backlight.

2. Description of the related Art

Figure 5:
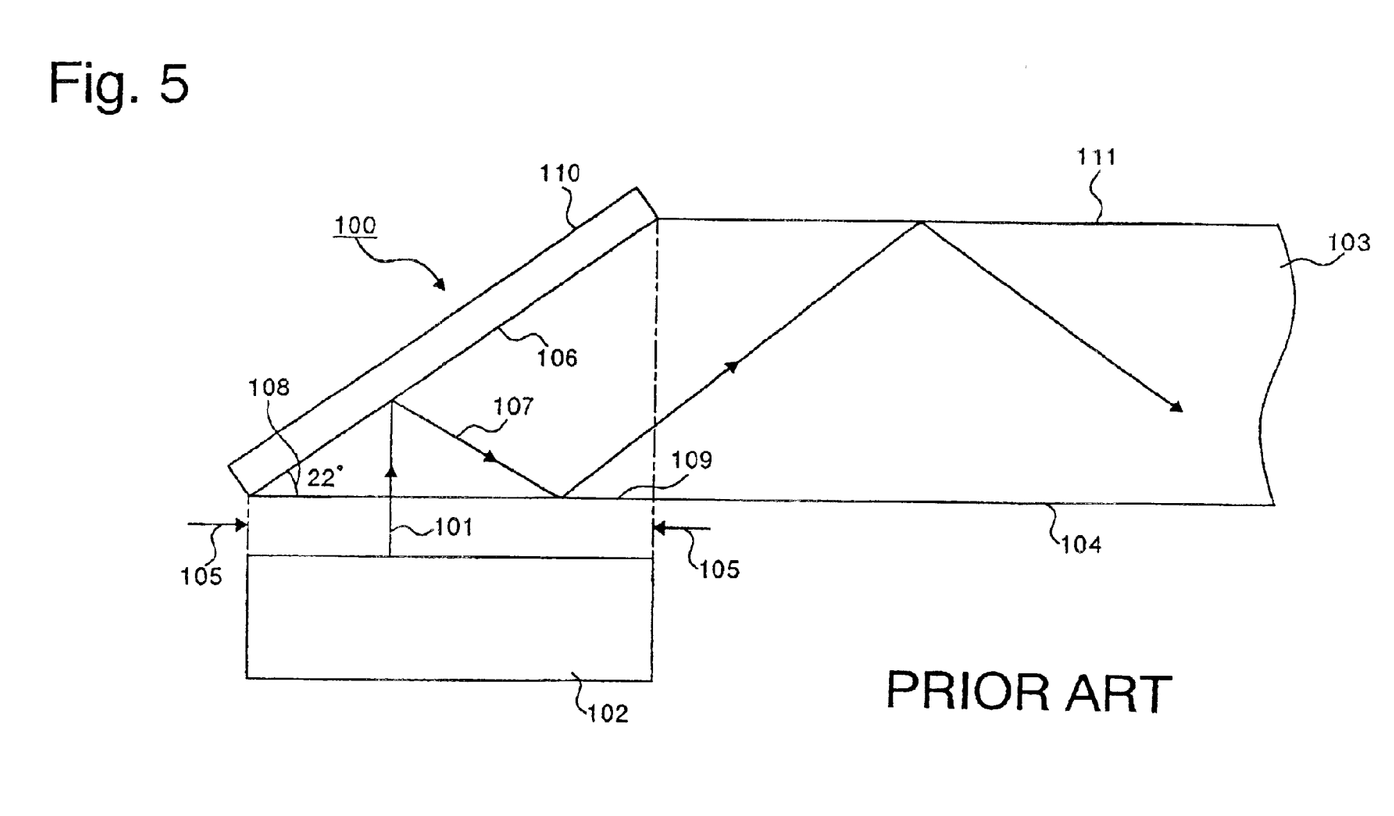
FIG. 5 is a sectional view showing a conventional liquid crystal display device.

A projector type backlight is conventionally used for a liquid crystal display device. FIG. 5 is a sectional view showing a backlight of a conventional liquid crystal display device. In this drawing, a backlight 100 is constructed to include a light source 102 for projecting light 101, and a light guide plate 103 for guiding the projected light 101 and diffusing it. A fluorescent tube, a cold cathode tube, or a hot cathode tube is used as the light source 102 shown in FIG. 5. The light source is located on a rear surface 104 side of the light guide plate 103 such that the projection direction of the light 101 is set perpendicular to the rear surface 104 of the light guide plate 103. Note that a width of the light 101 that enters the light guide plate 103 from the light source 102 at a right angle, that is, an incident light width 105 is dependent on a size of the light source 102.

The light guide plate 103 is made of a transparent plastic member and has a flat rectangular shape. The light guide plate 103 has at a side end portion a first refractive surface 106 for refracting the light 101 projected from the light source 102. The first refractive surface 106 is slanted at an angle of about 22 degrees with respect, to the plane of the light guide plate 103 and forms a slope covering the incident light width 105 of the light 101 as a whole. Note that a slant angle 108 of 22 degrees is slightly larger than a critical angle (about 19.8 degrees in the case of a polycarbonate member) at which light 107 reflected from the first refractive surface 106 is totally reflected from a second refractive surface 109 described later. In addition, the light guide plate 103 includes a reflective plate 110 on a rear side of the first refractive surface 106. The reflective plate 110 serves to reflect light (not shown) transmitted through the first refractive surface 106 without total reflection to return the light to the light guide plate 103.

In this light crystal display device, the light 101 which is projected from the light source 102 and has the constant incident light width 105 enters the light guide plate 103 from the rear surface 104 side thereof at a right angle and impinges on the first refractive surface 106 from an inner portion side of the light guide plate 103. One portion of the light 101 is reflected from the first refractive surface 106 and travels toward the second refractive surface 109 which is the rear surface 104 of the light guide plate 103. The other portion of the light 101 is transmitted through the first refractive surface 106, is reflected from the reflective plate 110 provided in the rear surface thereof, and enters the inner portion of the light guide plate 103 again to travel toward the second refractive surface 109. Thus, the light 107 is totally reflected from the second refractive surface 109 and then diffused into the light guide plate 103 while producing birefringence between a front surface 111 and the rear surface 104 of the light guide plate 103.

Figure 6:
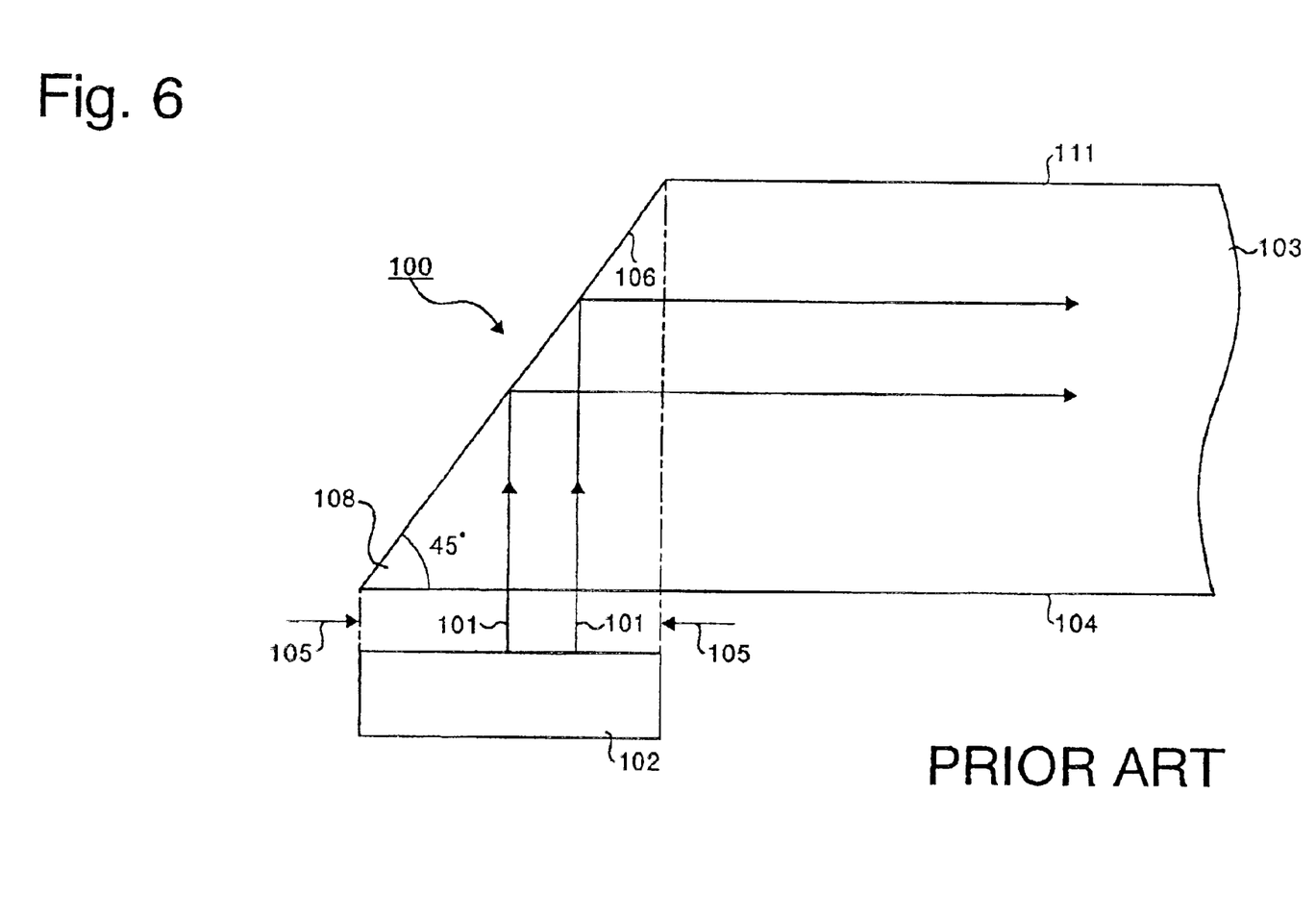
FIG. 6 is a sectional view showing a conventional liquid crystal display device.
Figure 7:
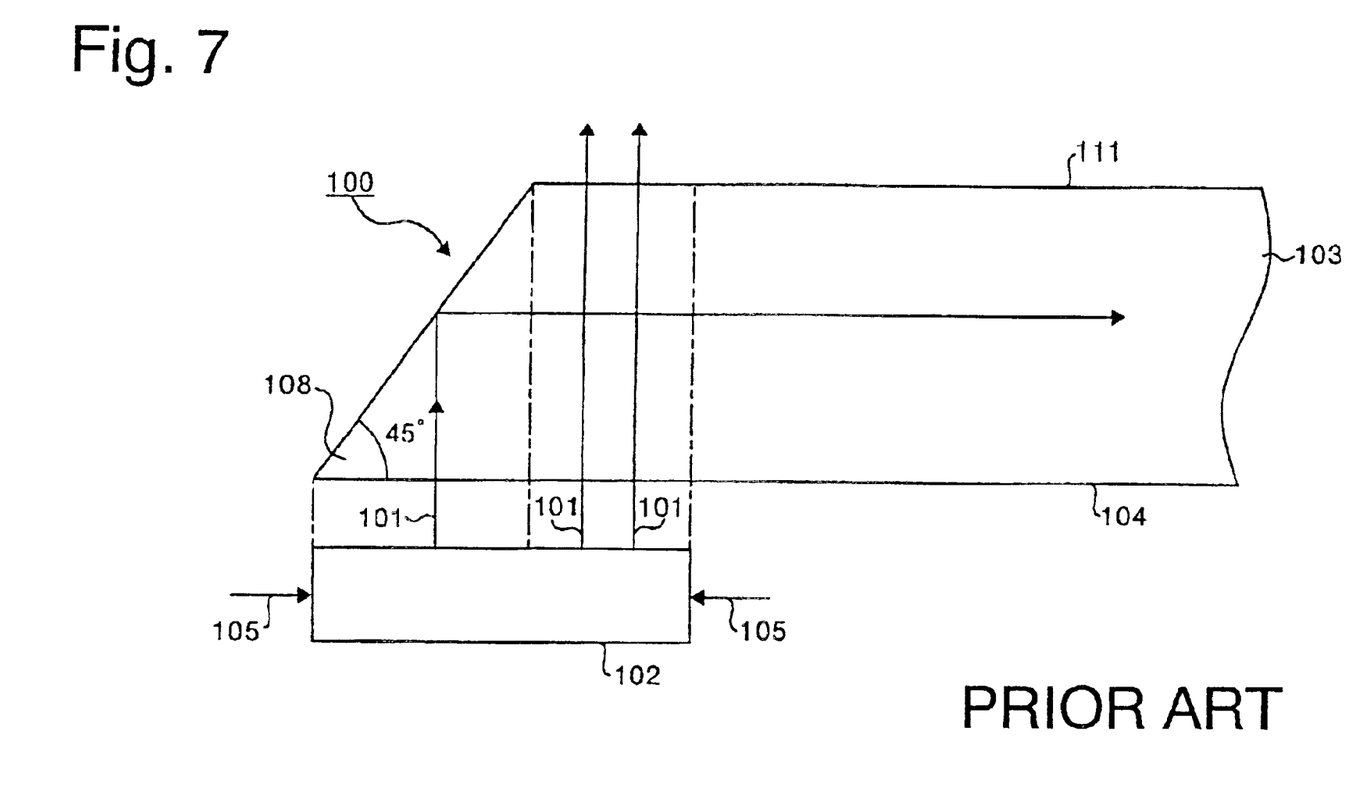
FIG. 7 is a sectional view showing a conventional liquid crystal display device.

Here, as the number of refraction is increased, the light 101 transmitted through the light guide plate 103 is attenuated, reducing the intensity thereof. Thus, in order to increase a brightness of a display panel (not shown), it is preferable that the number of refraction of the light 101 is as small as possible. However, since the birefringence of the light 101 is produced in the inner portion of the light guide plate 103 in a conventional liquid crystal display device as described above, there is a problem in that a loss of light is caused. In order to prevent such a loss of light, there is also proposed a structure in which the slant angle 108 of the first refractive surface 106 is set to 45 degrees. Such a structure is shown in FIG. 6. As is apparent from FIG. 6, in the case of such an angle, the light 101 projected from the light source 102 is refracted at an angle at which the refraction direction is substantially parallel with the plane of the light guide plate 103 in the first refractive surface 106 and travels the inner portion of the light guide plate 103 in a straight line without birefringence. However, it is generally difficult to keep such a sufficient slant angle 108 while meeting the requirement for reduction in thickness of a display device (not shown). For example, as shown in FIG. 7, when a thickness of the light guide plate 103 is reduced while keeping the slant angle 108 of 45 degrees, since an area of the first refractive surface 106 in a width direction becomes small, the incident light width 105 of the light 101 from the light source 102 cannot be sufficiently covered. Thus, since a portion 112 of the incident light 101 is transmitted through the surface 111 of the light guide plate 103 without impinging on the first refractive surface 106, there still remains a problem in that a loss of light is caused.

SUMMARY OF THE INVENTION

Therefore, an object of the present invention is to provide a liquid crystal display device capable of increasing a brightness of a display panel by effectively utilizing light 101 projected from a light source 102.

In order to achieve the above-mentioned object, according to the present invention, there is provided a liquid crystal display device including: a light source; and a light guide plate having a refractive surface for guiding light that enters an inner portion from the light source, in which: the refractive surface has a plurality of slant dividing surfaces and a plurality of connection surfaces each provided between the dividing surfaces; and a slant angle of the dividing surfaces is an angle at which the light projected from the light source is reflected in a direction substantially parallel with a plane of the light guide plate.

Further, in the liquid crystal display device, a portion of the light reflected from the dividing surface travels from the connection surface to a region outside the light guide plate and then enters an inner portion of the light guide plate from an adjacent dividing surface again.

Further in the liquid crystal display device, there is provided a reflective member that returns the light reflected from the adjacent dividing surface into the inner portion of the light guide plate when the portion of the light reflected from the dividing surface enters from the adjacent dividing surface again.

Alternatively, in the liquid crystal display device, there is provided a reflective member provided in a back side of the refractive surface, in which, of the light that enters from the light source, light transmitted through the connection surfaces is reflected from the reflective member and enter the inner portion of the light guide plate again.

DETAILED DESCRIPTION OF THE PREFERRED EMBODIMENTS

A liquid crystal display device of the present invention comprises a light source, a light guide plate which has a refractive surface divided into a plurality of divided surfaces and refracts light projected from the light source at the refractive surface to guide the light to the inner portion and toward a light output portion of the light guide plate, and a reflective member which is provided in the back side of the refractive surface and reflects light transmitted through the refractive surface to return the light to the inner portion of the light guide plate, a slant angle of the dividing surfaces being set to one at which the light projected from the light source is refracted in a direction substantially parallel with the plane of the light guide plate. According to the present invention, the light projected from the light source is refracted at the dividing surfaces provided in the refractive surface of the light guide plate in a direction substantially parallel with the plane thereof and guided to the inner portion of the light guide plate. Thus, since birefringence is suppressed, the brightness of the liquid crystal display device can be increased.

Also, a liquid crystal display device according to another aspect of the present invention comprises a light source, a light guide plate which has a refractive surface divided into a plurality of dividing surfaces and refracts light projected from the light source at the refractive surface to guide the light to the inner portion, and a reflective member which is provided in the back side of the refractive surface and reflects light transmitted through the refractive surface to return the light to the inner portion of the light guide plate, a slant angle of the dividing surfaces being set to one at which light that enters the dividing surfaces from the inner portion of the light guide plate is totally reflected without being transmitted through the dividing surfaces to refract the light in a direction substantially parallel with the plane of the light guide plate. According to the present invention, the dividing surfaces totally reflect the light that enters from the inner portion of the light guide plate without transmitting through the dividing surfaces and refract the light in a direction substantially parallel with the plane of the light guide plate to guide it to the inner portion thereof. Thus, production of birefringence is suppressed and the brightness of the liquid crystal display device can be further increased.

Also, the above refractive surface can be constructed such that a plurality of dividing surfaces are a triangular step shape. Further, since the refractive surface guides the projected light to the inner portion of the light guide plate without a loss, it is preferably provided so as to cover substantially the same region as a projection region of light which is perpendicularly projected from the light source to the back of the light guide plate. The triangular step shape may be a shark fin shape or a step shape. In addition, at least one side of the triangle may be not a straight line but a line with a slight curvature.

Hereinafter, the present invention will be described in detail with reference to the drawings. Note that the present invention is not limited to the embodiments. In addition, constitution elements in the embodiments described below include ones which can be generally designed and modified by a person skilled in the art.

Embodiment 1

Figure 1:
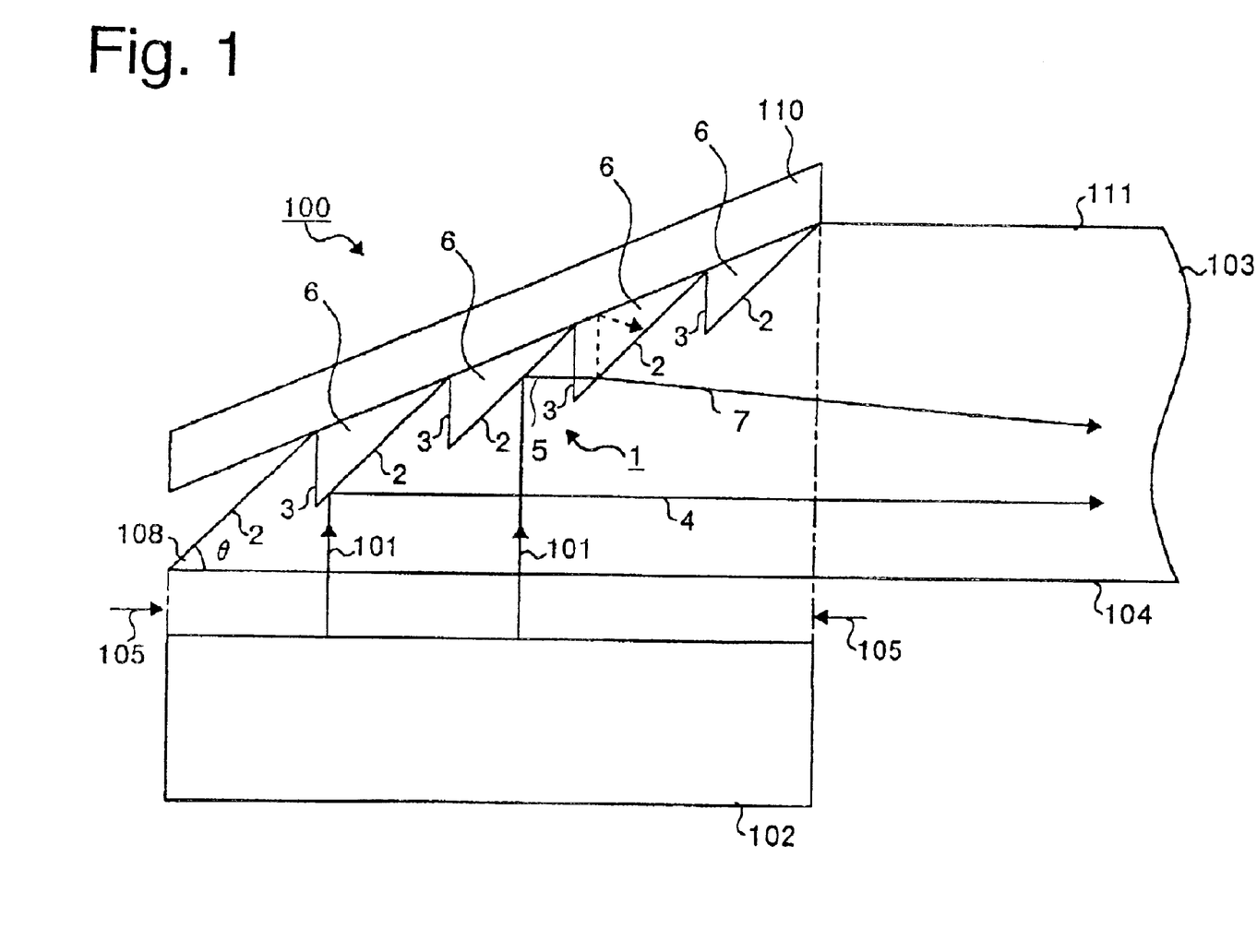
FIG. 1 is a sectional view showing a liquid crystal display device of the present invention.
Figure 2:
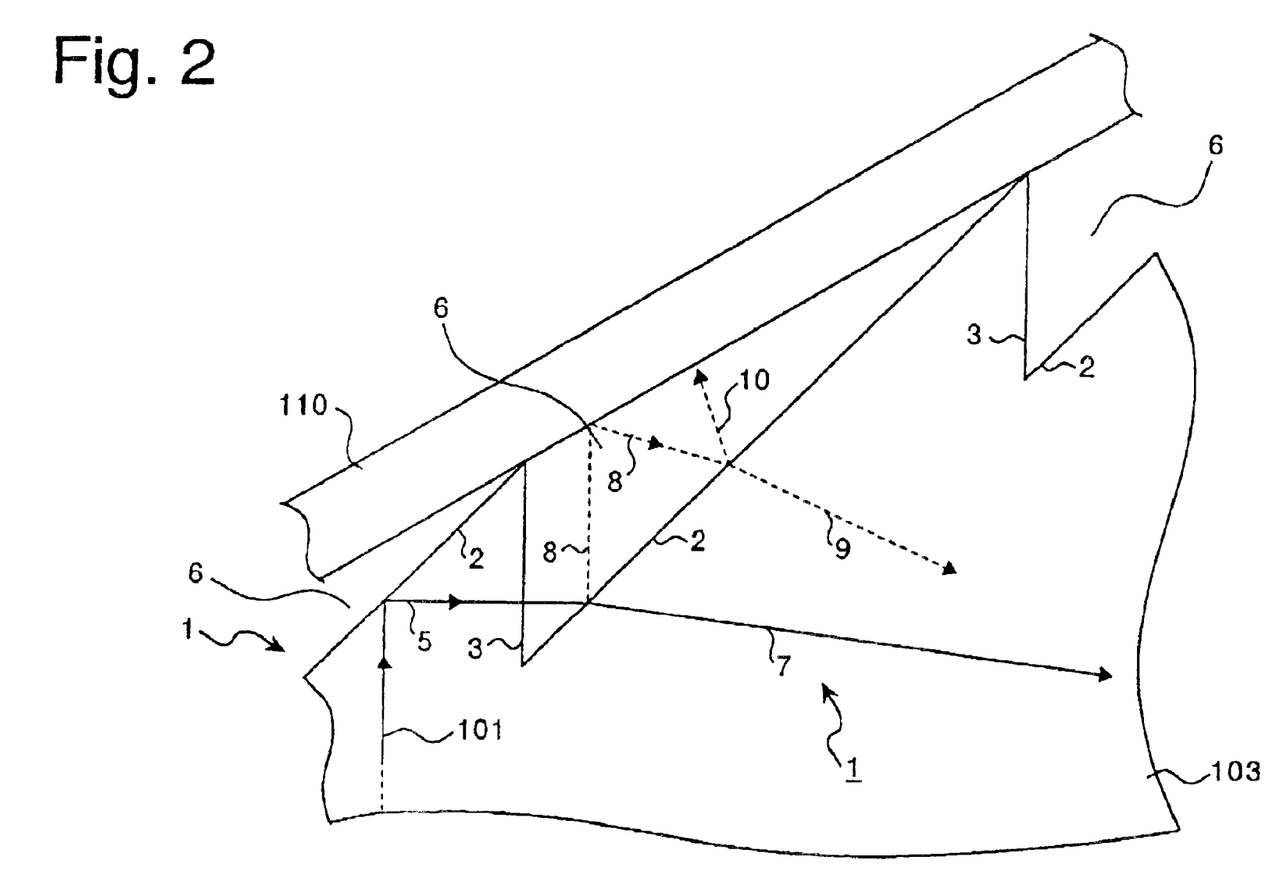
FIG. 2 is an enlarged sectional view showing a first refractive surface of the liquid crystal display device.

FIG. 1 shows a section showing a main part of a liquid crystal display device of this embodiment. FIG. 2 is a sectional view obtained by enlarging a first refractive surface 1 and its vicinities of a light guide plate 103 shown in FIG. 1. Note that the same reference symbols are provided for the same constitution elements as in the above conventional liquid crystal display devices in the drawing and the descriptions are omitted here. A backlight 100 of the liquid crystal display device is constructed to include a light source 102 and the light guide plate 103. The light guide plate 103 is made of a transparent plastic member and has a flat rectangular shape. In addition, the light guide plate 103 has a first refractive surface 1 for refracting light 101 projected from the light source 102 at the side end portion to guide it to the inner portion. It is preferable that the transparent plastic member is made of, for example, polycarbonate or acrylic.

As shown in FIG. 1, the first refractive surface 1 is formed by alternately arranging dividing surfaces 2 each having a slant angle 108 of 45 degrees and connection surfaces 3 each having a slant angle 108 of 90 degrees. Each of the dividing surfaces 2 is a refractive surface for mainly refracting light 101 projected from the light source 102 in parallel with the plane of the light guide plate 103. Each of the connection surfaces 3 is a surface for mainly connecting between the dividing surfaces 2. In addition, the first refractive surface 1 has a triangular step-shaped section as a whole so that a gentle slope covering the incident light width of the light 101 from the light source 102 is produced. Thus, these dividing surfaces 2 are located such that a refractive surface is faced with respect to substantially all of light that enters the light guide plate 103 from the light source 102 at an angle of 45 degrees. In addition, even when these dividing surfaces 2 are viewed from a center portion of the light guide plate 103, apparently, the refractive surface is faced at 45 degrees over the entire thickness direction of the light guide plate 103. Note that the first refractive surface 1 can be integrally formed by a mold (not shown) at the formation of the light guide plate 103. In addition, a reflective plate 110 made of a metallic member is provided in the first refractive surface 1 so as to cover the back of the triangular step shaped portion thereof.

According to the structure of this embodiment, the light 101 projected from the light source 102 enters a rear surface 104 of the light guide plate 103 at a right angle and travels to the first refractive surface. The light 101 impinges on the dividing surfaces 2 each having a slant of 45 degrees and is totally reflected therefrom to refract it in a direction substantially parallel with the plane of the light guide plate 103. One portion of light 4 of the totally reflected light travels the inner portion of the light guide plate 103 in a straight line without birefringence and is diffused. On the other hand, the other portion of light 5 of the totally reflected light is transmitted through the connection surfaces 3 each having 90 degrees and enters gaps 6 as air layers at a right angle, and then it enters the light guide plate 103 from adjacent dividing surfaces again.

The light 4 without birefringence having the same thickness (width) as the light guide plate 103 travels the inner portion of the light guide plate 103 in a straight line. In other words, the effective light 4 having substantially the same cross sectional area as the light guide plate 103 is guided to the inner portion thereof.

Also, the other portion of light 5 is transmitted through the connection surfaces 3 without reflection, passes through the air layers of the gaps 6 between the first refractive surface 1 and the reflective plate 110, and incident upon adjacent dividing surfaces each having 45 degrees from the back side thereof. One portion of light 7 of the incident light is slightly refracted to the rear surface 104 side of the light guide plate 103, transmitted through the dividing surfaces, and travels the inner portion of the light guide plate 103 in a straight line. On the other hand, the other portion of light 8 impinges on the back of the dividing surfaces and is reflected therefrom, and then impinges on the reflective plate 110 and is reflected therefrom so that it is incident upon the dividing surfaces from the back side thereof again. Of the light 8, One portion of light 9 is transmitted through the dividing surfaces 2 and the other portion of light 10 is reflected therefrom. Thus, the light 5 transmitted through the light guide plate 103 from the connection surfaces 3 is gradually taken in the inner portion of the light guide plate 3 while producing birefringence in the gaps 6 between the back of the dividing surfaces 2 and the reflective plate 110. Note that, since the taken light 7 and 9 is slightly refracted at an incidence into the dividing surfaces 2, it is not incident in parallel with the plane of the light guide plate 103 and there is a constant angle. Therefore, the taken light 7 and 9 is guided to the inner portion of the light guide plate 103 while producing birefringence between the rear surface 104 and a front surface 111 of the light guide plate 103.

According to this embodiment, the first refractive surface 1 has a large number of effective refraction surfaces (dividing surfaces 2) for reflecting light to obtain the light 4 parallel with the plane of the light guide plate 103, which are provided therein. Thus, a larger amount of effective light 4 without birefringence in the inner portion of the light guide plate 3 can be guided as compared with the conventional liquid crystal display devices. In addition, according to this embodiment, even if the light 8 is once transmitted through the light guide plate 103, it is finally taken in the inner portion of the light guide plate 103. Thus, the light 101 projected from the light source 102 is transmitted through the light guide plate 103 without a loss and can be guided to the inner portion thereof with minimizing waste. Therefore, the brightness of a display panel can be increased by the above effect. In addition, regardless of the slant angle 108 of the slope produced in the first refractive surface 1, the effective light parallel with the plane of the light guide plate 103 can be guided to the inner portion thereof and the light 101 projected into the light guide plate 103 can be effectively guided to the inner portion thereof. Thus, since the first refractive surface 1 having the smaller slant angle 108 can be formed as compared with the conventional liquid crystal display devices, the liquid crystal display device can be further slimmed.

Embodiment 2

Figure 3:
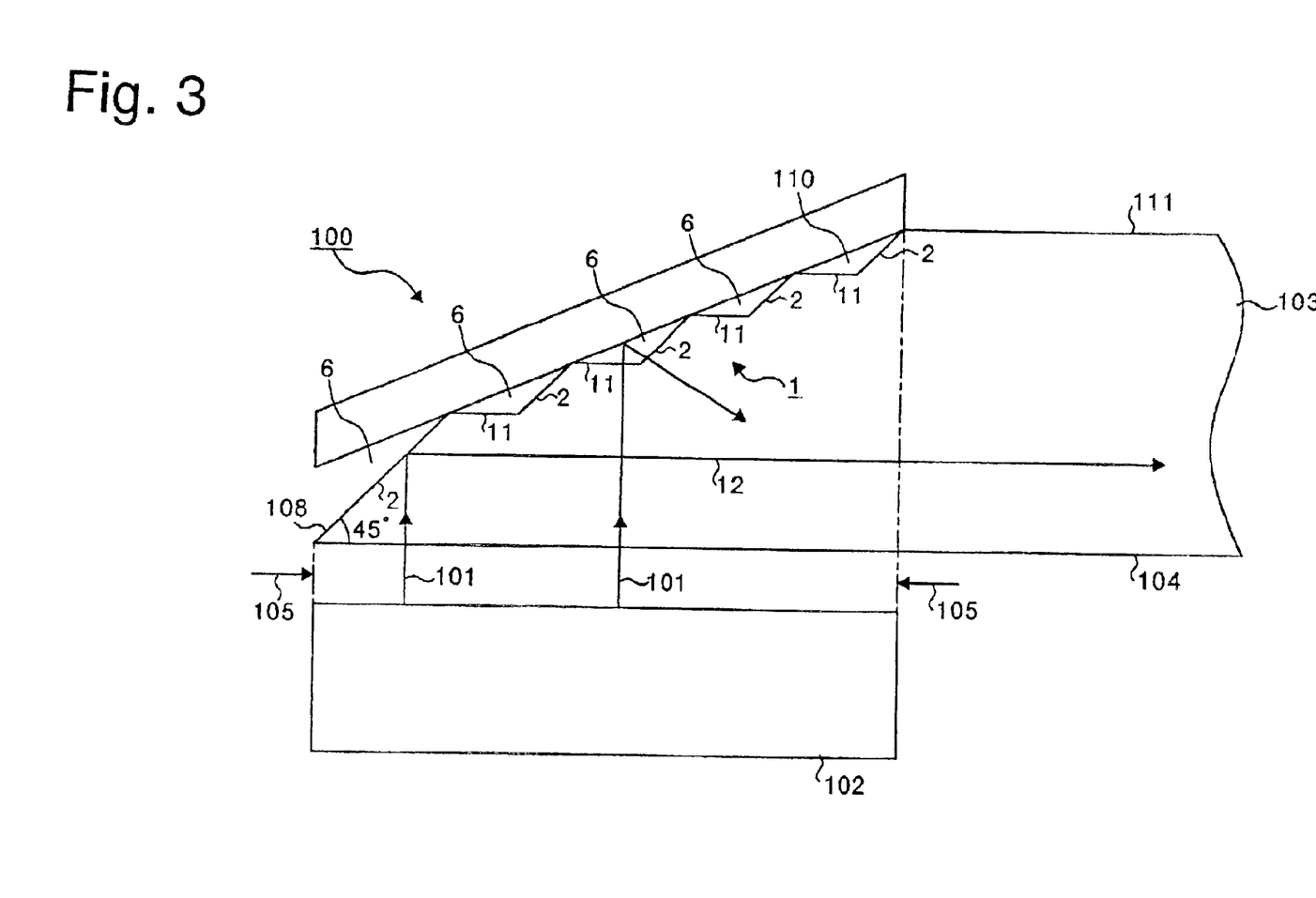
FIG. 3 is a sectional view showing a liquid crystal display device according to a modified example of the present invention.
Figure 4:
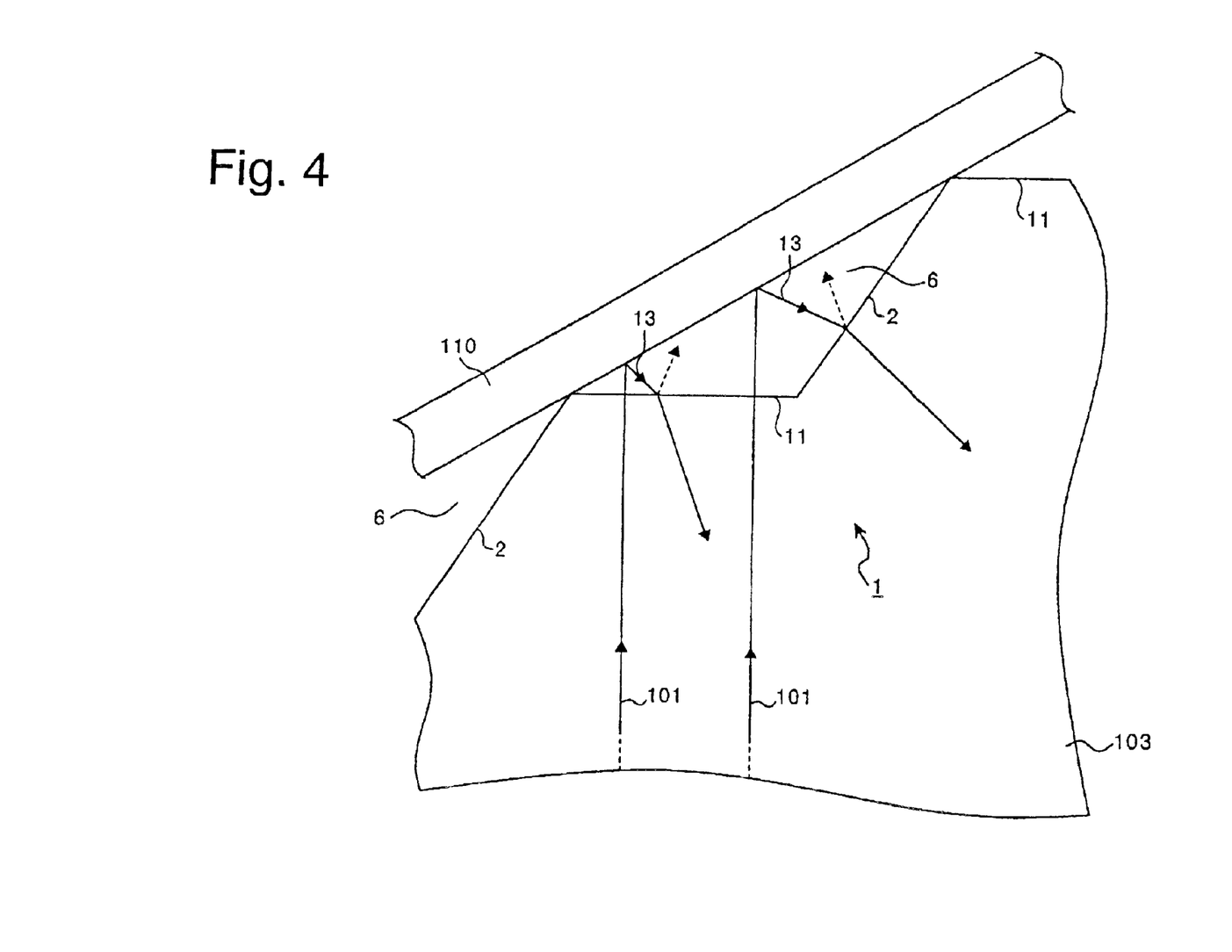
FIG. 4 an enlarged sectional view showing a first refractive surface of the modified example.

In the above Embodiment 1, a cross sectional shape of the first refractive surface 1 is the triangular step shape. However, the present invention is not limited to such a shape and it may be a step shape having a slant surface. FIGS. 3 and 4 are a sectional view of a main part of a liquid crystal display device and an enlarged sectional view showing a first refractive surface and its vicinities of a light guide plate according to such an embodiment, respectively. In other words, as shown in FIG. 3, a first refractive surface 1 may be formed by alternately arranging a plurality of dividing surfaces 2 each having a slant angle 108 of 45 degrees and a plurality of connection surfaces 11 substantially parallel with the plane of a light guide plate 103. According to such a structure, light 12 reflected from the dividing surfaces 2 is refracted in a direction substantially parallel with the plane of the light guide plate 103 and travels the inner portion of the light guide plate 103 in a straight line. In addition, as shown in FIG. 4, light incident upon the parallel connection surfaces 11 is transmitted therethrough and impinges on a reflective plate 110 provided in the back of the first refractive surface 1 to become reflection light 13. The reflection light 13 enters the light guide plate 103 from the connection surfaces 11 or the dividing surfaces 2 again and is taken therein again. In addition, the light 12 reflected from the connection surfaces 11 or the dividing surfaces 2 at this time impinges on the reflective plate 110 again. Thus, light is finally taken in the inner portion of the light guide plate 103 while producing birefringence in the gaps 6 between the reflective plate 110 and the first refractive surface 1. According to such a structure, the first refractive surface 1 has a large number of effective refraction surfaces 2 for reflecting light to obtain the light 12 parallel with the plane of the light guide plate 103, which are provided therein. In addition, even if the light 13 is once transmitted through the light guide plate 103, it is finally taken in the inner portion of the light guide plate 103. Thus, the same effect as the case of the above triangular step shape is obtained.

Also, in the above Embodiments 1 and 2, the slant angle 108 of the dividing surfaces 2 provided in the first refractive surface 1 is 45 degrees. However, the present invention is not limited to this angle as long as the slant angle 108 is an angle at which reflection light substantially parallel with the plane of the light guide plate 103 may be produced. This is because the dividing surfaces 2 mainly serve to guide the light 4 in which the number of refraction is small in the inner portion of the light guide plate 103 and the slant angle 108 thereof is preferably one capable of reflecting the effective light 4. Thus, for example, when a projection direction of light 101 from a provided light source 102 is not perpendicular to the light guide plate 103, the slant angle 108 of the dividing surfaces 2 may be changed corresponding to the projection direction of the light 101. Therefore, the same effect as the case where the slant angle 108 of the dividing surfaces 2 is set to be 45 degrees is obtained.

Also, in the above Embodiments 1 and 2, the slant angle 108 of the dividing surfaces 2 provided in the first refractive surface 1 is 45 degrees. However, the present invention is not limited to this angle. In the other words, the slant angle of the dividing surfaces 2 may be set to be an angle at which the light 101 from the light source 102 is totally reflected from the dividing surfaces 2 without being transmitted therethrough when it is incident upon the dividing surfaces 2 (not shown) from the inner portion of the light guide plate 103. Specifically, for example, when a polycarbonate member having a refractive index of 1.56 is used as a material for the light guide plate 103, the slant angle 108 may be selected from an angle of about 39.9 degrees or larger to an angle of smaller than 45 degrees. Thus, since a critical value of the slant angle 108 is changed according to a member of the light guide plate 103, it is not unique. In such a structure, all the light 101 incident upon into the dividing surfaces 2 from the inside of the light guide plate 103 is totally reflected without being transmitted therethrough and guided to the inner portion of the light guide plate 103. According to such a structure, since there is no light attenuated by being transmitted through the dividing surfaces 2 from the inside of the light guide plate 103 and producing birefringence between the reflective plate 110 and the back of the dividing surfaces 2, a loss of light is suppressed.

As described above, according to the liquid crystal display device of the present invention, the light projected from the light source is refracted at the dividing surfaces provided in the refractive surface of the light guide plate in a direction substantially parallel with the plane thereof and guided to the inner portion of the light guide plate. Thus, since birefringence is hard to produce, a loss of light is reduced and the brightness of the liquid crystal display device can be increased. In addition, according to the liquid crystal display device of the present invention, the dividing surfaces totally reflect light that enters from the inner portion of the light guide plate without transmitting and refract the light in a direction substantially parallel with the plane of the light guide plate to guide it to the inner portion thereof. Thus, birefringence is suppressed and the brightness of the liquid crystal display device can be further increased.

Also, according to the liquid crystal display device of the present invention, the dividing surfaces of the refractive surface are arranged in a triangular step shape or a step shape. Thus, a large number of dividing surfaces can be effectively arranged in a space-saving manner with respect to a projection direction of light from the light source. In addition, since the refractive surface is formed to cover substantially the same region as a projection region of light, the light projected to the region is guided to the inner portion of the light guide plate without a loss. Thus, the light from the light source can be effectively utilized as back light.

What is claimed is:

1. A liquid crystal display device having a light guide with a refractive surface, comprising:
    a light source;
    a light guide plate having a front surface, a rear surface with a light input portion into which light from the light source is projected, and a refractive surface opposed to and facing the light input portion for guiding light that enters the light input portion into an inner portion of the light guide plate toward a light output portion thereof; and
    a liquid crystal display adjacent to the light output portion of the light guide plate;
    wherein the refractive surface is inclined toward the rear surface of the light guide plate, and has a plurality of divided surfaces each being connected by a connection surface; and
    wherein an angle between the rear surface and the divided surfaces is larger than an angle between the rear surface and a line formed by connecting peaks formed by the divided surface and the connection surfaces.

2. A liquid crystal display device according to claim 1; wherein light that is reflected by a respective divided surface onto an adjacent connection surface is redirected toward the inner portion of the light guide plate by another divided surface.

3. A liquid crystal display device according to claim 2; further comprising a reflective member behind the refractive surface for reflecting light that has exited from a respective divided surface toward the inner portion of the light guide plate.

4. A liquid crystal display device according to claim 1; further comprising a reflective member behind the refractive surface for reflecting light that has exited from a respective divided surface toward the inner portion of the light guide plate.

5. A liquid crystal display device according to claim 1; wherein the connection surfaces are parallel with a direction of the light entering the light input portion from the light source.

6. A liquid crystal display device according to claim 1; wherein the connection surfaces are orthogonal to a direction of the light entering the light input portion from the light source.

7. A liquid crystal display device according to claim 1; wherein the divided surfaces are arranged at an angle sufficient to cause total reflection of the light projected from the light source into the light output portion.

8. A liquid crystal display device according to claim 1; wherein the refractive surface is constructed such that the divided surfaces and corresponding connection surfaces form a triangular step shape.

9. A liquid crystal display device according to claim 1; wherein a size of the refractive surface corresponds to a width of the light input portion so as to refract substantially all of the light projected from the light source toward the light output portion.

10. A liquid crystal display device according to claim 1; wherein the light guide plate is formed of polycarbonate.

11. A backlight for a liquid crystal display device, comprising: a light source; and a light guide plate adjacent thereto and having a front surface, a rear surface with a light input portion into which light from the light source is projected, and a refractive surface opposed to and facing the light input portion for guiding light that enters the light input portion toward a light output portion of the light guide plate onto a liquid crystal display device; wherein the refractive surface is inclined toward the rear surface of the light guide plate and has a plurality of stepped surface portions for guiding light that enters the light input portion toward the light output portion of the light guide plate.

12. A backlight for a liquid crystal display device according to claim 11; wherein an angle between the rear surface of the light guide plate and the stepped surface portions is larger than an angle between the rear surface and a line formed by connecting peaks of the stepped surface portions.

13. A backlight for a liquid crystal display device according to claim 11; wherein a slant angle of the stepped surface portions is set such that light projected from the light source is reflected in a direction substantially parallel with a plane of the light guide plate.

14. A backlight for a liquid crystal display device according to claim 11; wherein light that is reflected by a respective stepped surface portion onto another stepped surface portion is redirected toward the light output portion of the light guide plate by the other stepped surface portion.

15. A backlight for a liquid crystal display device according to claim 11; further comprising a reflective member behind the refractive surface for reflecting light that has exited from a respective stepped surface portion back into an inner portion of the light guide plate.

16. A backlight for a liquid crystal display device according to claim 11; wherein the stepped surface portions are each arranged at an angle sufficient to cause total reflection of the light projected from the light source.

17. A backlight for a liquid crystal display device according to claim 11; wherein each of the stepped surface portions has a triangular shape.

18. A backlight for a liquid crystal display device according to claim 11; wherein a size of the refractive surface corresponds to a width of the light input portion so as to refract substantially all of the light projected from the light source.

19. A backlight for a liquid crystal display device according to claim 11; wherein the light guide plate comprises a polycarbonate member.

20. A backlight for a liquid crystal display device according to claim 11; wherein an angle between the stepped surface portions and the rear surface of the light guide plate is about 45 degrees.

21. A backlight for a liquid crystal display device according to claim 20; wherein the angle between the stepped surface portions and the rear surface of the light guide plate is larger than an angle between the rear surface of the light guide plate and portions of the refractive surface other than the stepped surface portions.

* * * * *